US010058793B2

(12) United States Patent
Cortelyou et al.

(10) Patent No.: US 10,058,793 B2
(45) Date of Patent: Aug. 28, 2018

(54) SPECIAL EFFECTS TECHNIQUES

(71) Applicant: Universal City Studios LLC, Universal City, CA (US)

(72) Inventors: Robert J. Cortelyou, Orlando, FL (US); Amanda Zielkowski, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/353,575

(22) Filed: Nov. 16, 2016

(65) Prior Publication Data

US 2017/0056784 A1 Mar. 2, 2017

Related U.S. Application Data

(63) Continuation of application No. 14/835,468, filed on Aug. 25, 2015, now Pat. No. 9,504,930.

(60) Provisional application No. 62/042,106, filed on Aug. 26, 2014.

(51) Int. Cl.
*A63J 5/02* (2006.01)
*A63H 33/22* (2006.01)
*A63H 27/00* (2006.01)
*A63H 30/04* (2006.01)
*A63J 5/04* (2006.01)
(Continued)

(52) U.S. Cl.
CPC ............... *A63J 5/02* (2013.01); *A63H 27/00* (2013.01); *A63H 27/12* (2013.01); *A63H 30/04* (2013.01); *A63H 33/22* (2013.01); *A63J 5/023* (2013.01); *A63J 5/025* (2013.01); *A63J 5/028* (2013.01); *A63J 5/04* (2013.01); *A63J 2005/008* (2013.01)

(58) Field of Classification Search
CPC .. A63G 31/00; A63G 31/16; A63J 5/00; A63J 5/02; A63J 19/00; A63J 19/12; B04C 19/00; F41G 7/00; F41G 7/30; F42B 15/00; F42B 15/01
USPC ............ 472/57–61, 130; 244/75.1, 175, 189, 244/78.1, 76 R
See application file for complete search history.

(56) References Cited

U.S. PATENT DOCUMENTS

| 8,115,149 B1 * | 2/2012 | Manole ................... F42B 10/18 102/430 |
| 8,190,305 B1 | 5/2012 | Prince et al. |
| 8,702,033 B2 | 4/2014 | Regmi |

(Continued)

FOREIGN PATENT DOCUMENTS

| CN | 103212211 | 7/2013 |
| WO | 2013002778 | 1/2013 |
| WO | 2014077524 | 5/2014 |

OTHER PUBLICATIONS

PCT/US2015/046999 International Search Report and Written Opinion dated Nov. 26, 2015.

*Primary Examiner* — Kien Nguyen

(74) *Attorney, Agent, or Firm* — Fletcher Yoder, P.C.

(57) ABSTRACT

A system in accordance with present embodiments includes a ground controller and an unmanned aerial vehicle including communications circuitry configured to transmit signals to and receive signals from the ground controller. The system may also include a vehicle controller configured to execute a flight plan and at least one special effects module. The system may also include a special effects module controller configured to cause the special effect to be activated in response to an activation signal from the ground controller.

23 Claims, 11 Drawing Sheets

(51) Int. Cl.
    *A63G 31/00*    (2006.01)
    *A63J 5/00*    (2006.01)

(56) References Cited

U.S. PATENT DOCUMENTS

| | | |
|---|---|---|
| 8,825,225 B1 | 9/2014 | Stark et al. |
| 8,862,285 B2 | 10/2014 | Wong et al. |
| 2010/0227527 A1 | 9/2010 | Smoot et al. |
| 2014/0231590 A1 | 8/2014 | Trowbridge et al. |

\* cited by examiner

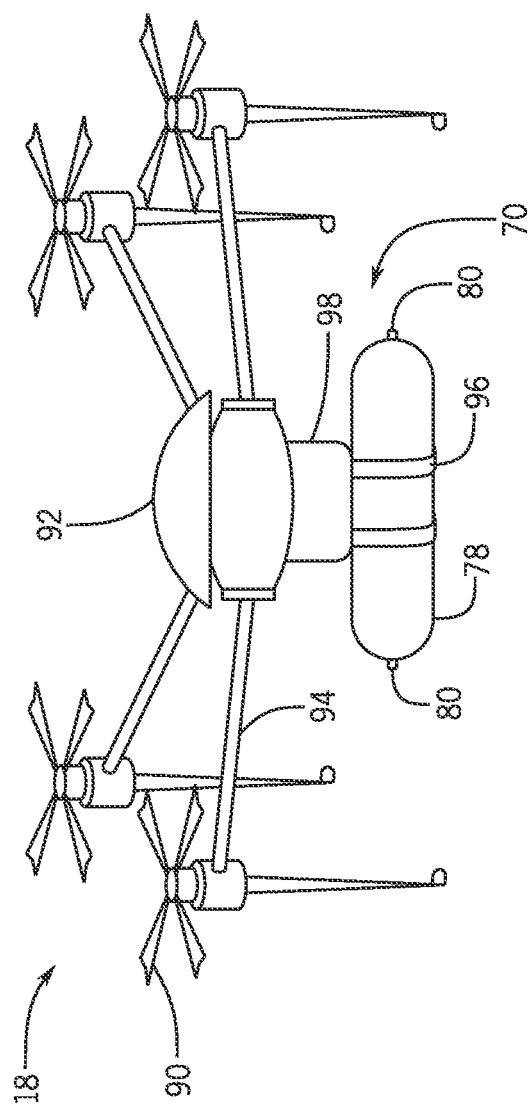

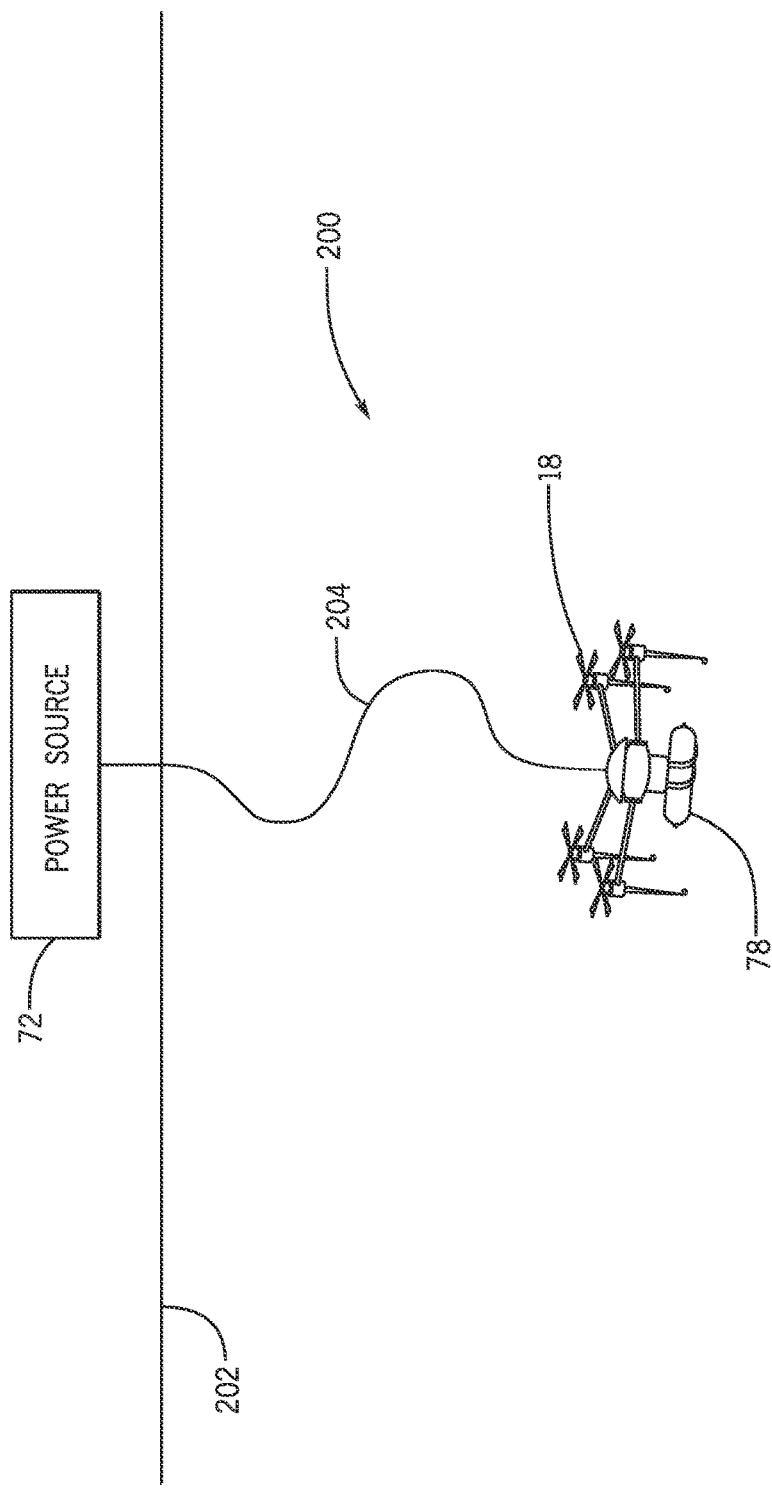

SPECIAL EFFECTS TECHNIQUES

CROSS-REFERENCE TO RELATED APPLICATIONS

The present application is a continuation of U.S. patent application Ser. No. 14/835,468, entitled "Special Effects Techniques" filed Aug. 25, 2015 which claims the benefit of U.S. Provisional Application No. 62/042,106, entitled "Untethered Special Effects Platform" and filed Aug. 26, 2014, the disclosure of which are incorporated herein by reference for all purposes.

FIELD OF DISCLOSURE

The present disclosure relates generally to the field of amusement parks. More specifically, embodiments of the present disclosure relate to methods and equipment utilized to provide amusement park experiences.

BACKGROUND

Throughout amusement parks and other entertainment venues, special effects can be used to help immerse guests in the experience of a ride or show. The location of these special effects, such as water lobs or scent cannon blasts, is traditionally constrained by the necessity to attach the effect assembly to a facility or structure. Once installed, the location of the effect assembly is typically static and difficult to change. In one example, theme parks may include characters performances or live shows that tie in to the rides or other entertainment options. Because theme parks attract repeat visitors, it is desirable to frequently change such shows to keep even repeat visitors entertained. However, static effects assemblies may constrain the ability of a theme park to modify live shows and their corresponding special effects.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a special effects system includes a ground controller and an unmanned aerial vehicle. The unmanned aerial vehicle includes communications circuitry configured to transmit signals to and receive signals from the ground controller and a vehicle controller configured to execute a flight plan. The unmanned aerial vehicle also includes at least one special effects module of the unmanned aerial vehicle. The unmanned aerial vehicle also includes a special effects module controller of the at least one special effects module, the special effects module controller configured to instruct the special effects module to activate the special effect in response to an activation signal from the ground controller.

In accordance with another embodiment, a special effects system includes a ground controller and plurality of unmanned aerial vehicles respectively comprising communications circuitry configured to transmit signals to and receive signals from the ground controller; a vehicle controller configured to execute a flight plan; and at least one special effects module. The special effects module includes a special effects material; and a special effects module controller configured to cause the special effects material to be released in response to an activation signal from the ground controller, wherein the respective flight plans of the unmanned aerial vehicles are independent of one another and are configured to be executed within a running time of a theme park show. The ground controller is configured to generate respective activation signals to the respective unmanned aerial vehicles to activate respective special effects during the running time of the theme park show.

In accordance with another embodiment, a special effects system includes a ground controller and a plurality of unmanned aerial vehicles respectively comprising communications circuitry configured to transmit signals to and receive signals from the ground controller. The system also includes a vehicle controller configured to execute a flight plan; and at least one special effects module. The special effects module includes a special effects material; and at least one special effects module controller configured to cause the special effects material to be released in response to an activation signal from the ground controller. The ground controller is configured to generate respective maintenance signals to the respective unmanned aerial vehicles to return for service.

DRAWINGS

These and other features, aspects, and advantages of the present disclosure will become better understood when the following detailed description is read with reference to the accompanying drawings in which like characters represent like parts throughout the drawings, wherein:

FIG. 5 is a perspective view of a special effects vehicle in accordance with present techniques;

FIG. 12 is a schematic diagram of a tethered special effects vehicle.

DETAILED DESCRIPTION

Presently disclosed embodiments allow effects to be placed in previously unreachable areas, such as above a lagoon or in open space, using Unmanned Aerial Vehicles. Accordingly, the location of an effect can be programmed to move along a path throughout the attraction, show, ride or other venue. This path may be reprogrammable or provided in real-time, which permits straightforward changes or updates to the locations of any special effects. Accordingly, certain embodiments of the disclosure "untether" a special effect from a dedicated location and eliminate the need for attachment to a stationary facility or structure.

In accordance with present embodiments, an Unmanned Aerial Vehicle (UAV), e.g., multicopter, is outfitted to provide a special effect or special effects, becoming an untethered special effects platform. The specials effects delivered by such a platform could include water effects, scent cannons, compressed air blasts, steam blasts, theatrical smoke or fog, snow, bubbles, confetti, flame effects, or directional speakers and other audio effects.

In one embodiment, the untethered special effect vehicle may be used in conjunction with a live show. The placement or path of the special effect may be pre-choreographed or provided in real-time to correspond to the show. That is, the operation of the special effect vehicle may be triggered to activate during the show and to travel along the pre-programmed path, as well as deliver special effects at designated times and/or locations, with no manual intervention. The special effects platform could be controlled by an onboard controller, an off-board controller, or a combination thereof. Multiple platforms could be used in the same show to provide effects in different locations, and these platforms may share a controller or may operate under control of a central control system.

Present embodiments of the special effects vehicles and associated techniques are more versatile than traditional special effects techniques. Present embodiments apply UAV technology to the entertainment industry and particularly to the provision of physical special effects and action-based special effects features (e.g., equipment for providing water effects, scent cannons, compressed air blasts, steam blasts, theatrical smoke or fog, snow, bubbles, confetti, flame effects) that are not merely lighting and projectors. As noted above, present embodiments may provide directional audio or other types of audio using directional speakers from a UAV platform positioned in previously inaccessible locations. In addition, the disclosed special effects vehicles may be used in conjunction with live shows, character interactions (e.g., non show-based interactions with theme park guests or other characters), theme park rides, or other theme park or entertainment events.

Figure 1:
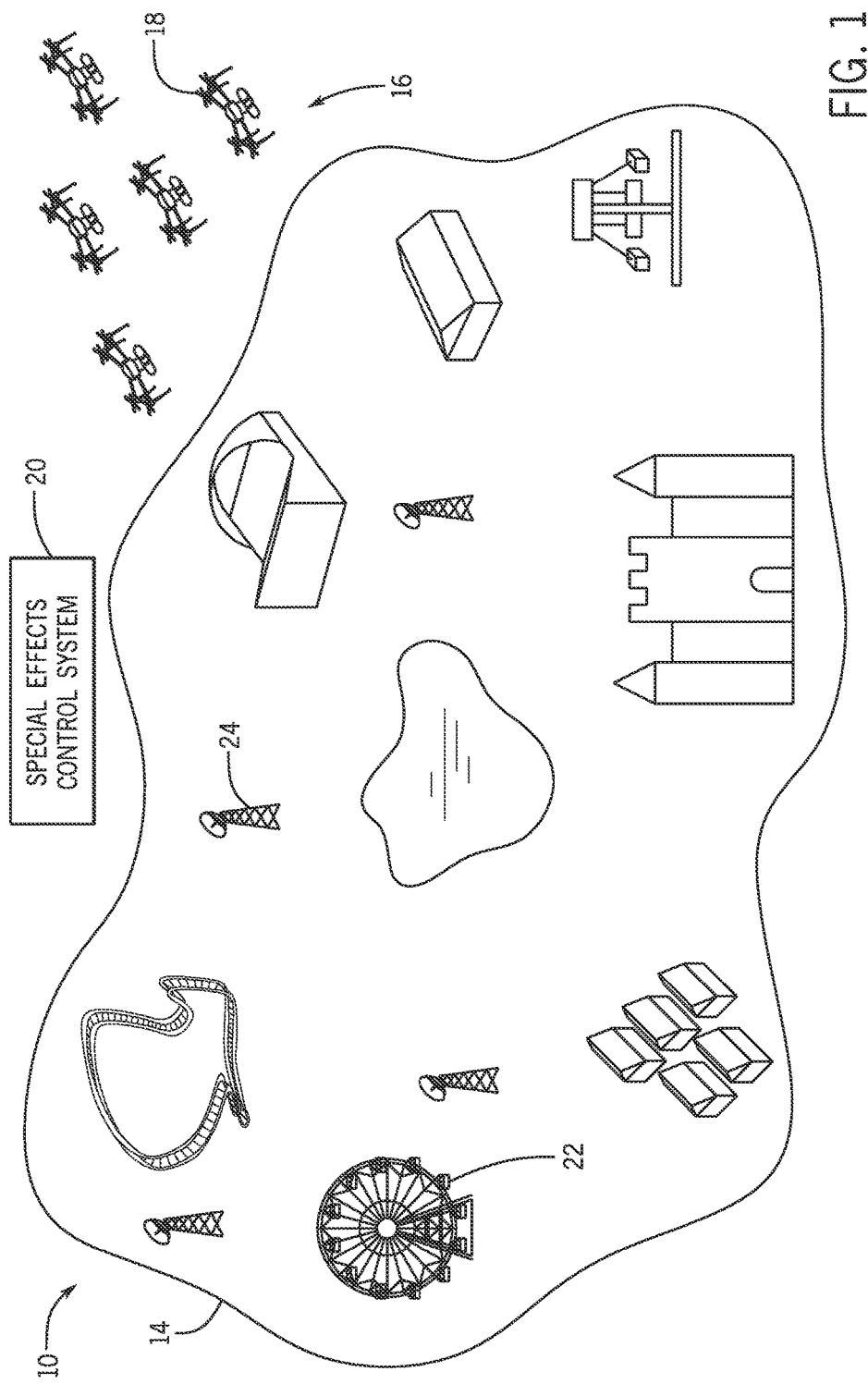
FIG. 1 is a schematic view of a theme park including a special effects vehicle system in accordance with present techniques.

FIG. 1 is a schematic view of a special effects vehicle system 10 operated in the setting of a theme park 14. A fleet 16 of special effects vehicles 18 is operated under control of a ground controller, e.g., a special effects control system 20. The park includes a number of attractions 22, which may include rides, entertainment venues, shopping, or restaurants. Via the control system 20, individual special effects vehicles 18 may be deployed to various locations throughout the park 14 to facilitate specific special effects. The fleet 16 may include one or more types of vehicles 18, and each individual vehicle 18 may be configured for one or more special effects. The vehicles 18 communicate wirelessly with the special effects control system 20 to receive instructions to execute a desired flight plan and/or to trigger a special effect. The communication may be mediated through one or more radio towers 24 that, in certain embodiments, may distributed throughout the park 14.

Figure 2:
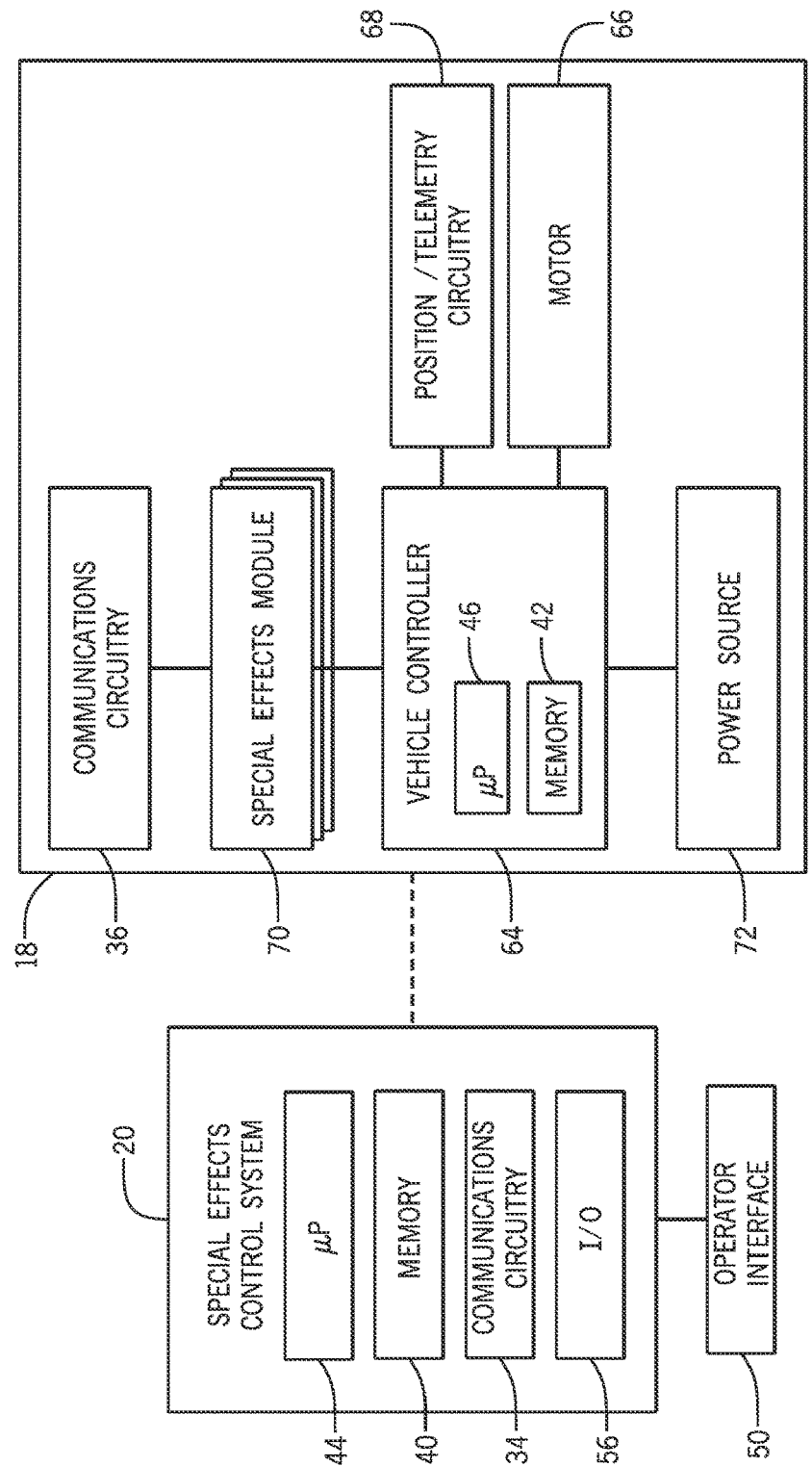
FIG. 2 is a block diagram of the special effects vehicle system in accordance with present techniques.

FIG. 2 is a block diagram of the communication interaction between the special effects control system 20 and an individual special effects vehicle 18 to facilitate special effects triggering. One or both of the special effects control system 20 and an individual special effects vehicle 18 may include communications circuitry (e.g., communications circuitry 34 or 36), such as antennas, radio transceiver circuits, and signal processing hardware and/or software (e.g., hardware or software filters, A/D converters, multiplexers amplifiers), or a combination thereof, and that may be configured to communicate over wireless communication paths via IR wireless communication, satellite communication, broadcast radio, Microwave radio, Bluetooth, Zigbee etc. Such communication may also include intermediate communications devices, such as radio towers 24 (see FIG. 1). In addition, one or both of the special effects control system 20 and an individual special effects vehicle 18 may include a memory device (e.g., memory device 40 or 42) for storing instructions executable by a processor (e.g., processor 44 or 46) to perform the methods and control actions described herein. The processor may include one or more processing devices, and the memory may include one or more tangible, non-transitory, machine-readable media. By way of example, such machine-readable media can include RAM, ROM, EPROM, EEPROM, or optical disk storage, magnetic disk storage or other magnetic storage devices, or any other medium which can be used to carry or store desired program code in the form of machine-executable instructions or data structures and which can be accessed by the processor or by other processor-based devices (e.g., mobile devices). For example, special effects control system 20 may be accessed by an operator interface 50, e.g., a computer-based workstation or a mobile device, and/or may include an input/output interface 56 and a display.

While the special effects control system 20 may be implemented as a separate device or devices from the special effects vehicles 18, it should be understood that certain functionality disclosed as part of the special effects control system 20 may be additionally or alternatively implemented within the special effects vehicles 18. As illustrated, the special effects vehicle 18 includes a vehicle controller 64 that controls execution of a flight plan or flight path for the vehicle 18. The flight plan may be communicated from the special effects control system 20 (e.g., in real-time) or may be pre-programmed and stored in the memory 42. Further, in certain embodiments, operator input may be implemented in real-time to generate a flight plan and/or may override previous flight plan instructions. The vehicle controller 64 controls operation of the motor 66 and other flight components of the special effects vehicle 18 to execute the desired flight plan. In one embodiment, the special effects vehicle 18 may provide navigation or guidance information to the special effects control system 20 to use as feedback for determining when to trigger the special effect. For example, the special effect may be triggered at a particular geographic location, GPS coordinates, or relative to a particular landmark or attraction. Accordingly, the special effects vehicle 18 may use location information determined by position and/or telemetry circuitry 68, such as GPS information accessed from a GPS chip, triangulation information from radio communication, and/or feedback from one or more cameras, position sensors, or proximity sensors on the special effects vehicle 18. Position and/or telemetry circuitry 68 may also provide feedback to keep the special effects vehicle 18 outside of a particular boundary to prevent guest interference with the vehicles. The special effects vehicle 18 may also include one or more power sources 72, e.g., a battery, solar cells, inductive coupling devices. As disclosed, the special effects vehicle 18 may be implemented as an untethered platform for special effects using an on-board power source, such as a self-charging or rechargeable power source. However, in certain embodiments, the special effects vehicle 18 may be coupled to a power source by a cord.

Figure 3:
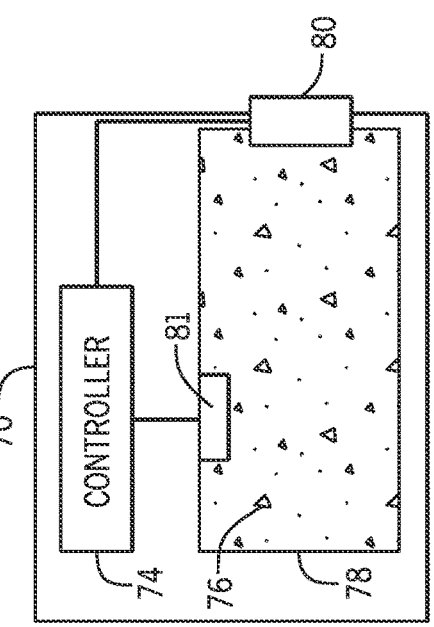
FIG. 3 is a block diagram of a special effects module in accordance with present techniques.

FIG. 3 is a block diagram of an embodiment of a special effects module 70 that includes a controller 74 that may include a processor and a memory storing instructions and circuitry for coupling to and controlling mechanical components of the special effects module 70. The special effects module also includes a special effects material 76. The special effects material 76 may be contained within a housing 78, such as a canister or case, that is capable of being triggered to release the special effects material 76, which may be any suitable special effects material that is nontoxic and for entertainment purposes, such as water, snow, confetti, glitter, smoke, bubbles, scented fluid, etc. In one embodiment, the special effects material 76 may be a reel of ticker tape or may be copies of a paper message that is released. The triggering may be mediated by the special effects control system 20. For example, an activation signal (e.g., a release signal) to release the special effects material may be communicated from the special effects control system 20 (see FIG. 2) to the special effects module 70. In turn, the special effects module controller 74 may activate a release mechanism 80 (e.g., may open a valve, release a door, activate a fan or plunger, pierce a cap, etc.) to allow the special effects material 76 to be disseminated in the desired location. The special effects material 76 may be contained under pressure, e.g., via a $CO_2$ cartridge mounted in fluid communication with the housing 78, such that opening of the release mechanism 80 results in a burst or discharge. In one embodiment, the special effects material 76 is configured within the module 70 for one-time use. That is, opening the release mechanism 80, e.g., opening a valve, activating a blower, or puncturing a seal, releases all or most of the material 76. The release mechanism 80 may also close after a preset period of time and, in certain embodiments, before all or most of the special effects material 76 is disseminated, to permit multiple uses. The special effects module 70 may also include a sensor 81 or other feedback device that provides data to the controller 74, which in turn may provide the data to the ground controller, related to how much special effects material 76 remains in the housing 78. The sensor 81 may be a pressure sensor, an optical sensor, a weight sensor, etc. For example, an optical sensor may provide fill level information within the special effects module. A change in optical readings may indicate that the material is below a certain threshold till level. In other embodiments, the feedback device may provide data about a misrelease (e.g., a failure of the release mechanism 80 to properly open or a failure to sense an expected decrease in the fill of the special effects material after release). Such misrelease data may in turn trigger vehicle maintenance.

Figure 4:
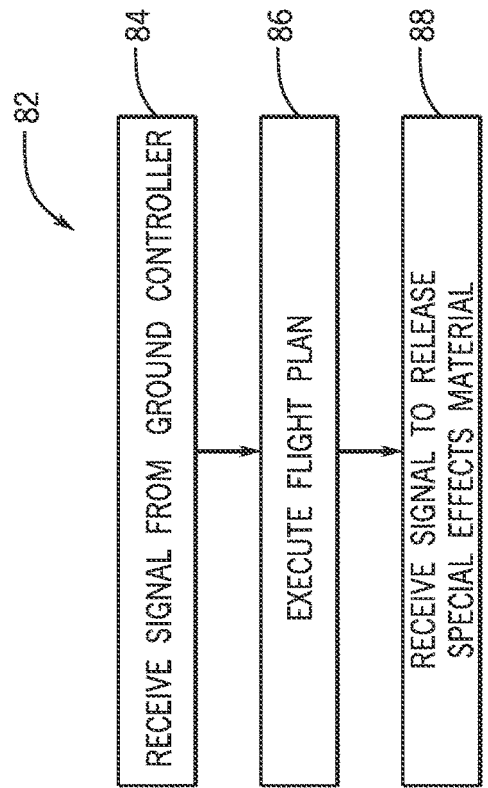
FIG. 4 is a flow diagram of a method for using the special effects vehicle system in accordance with present techniques.

As provided herein, a special effects vehicle may operate to execute a flight plan with coordinated special effects at a desired location and at a desired time. FIG. 4 is a flow diagram of a method 82 of controlling the special effects vehicle 18. The method may be implemented by the system 10 using a ground controller, e.g., the special effects control system 20 (see FIG. 1). The vehicle may receive a signal from a ground controller (block 84) that results in execution of a flight plan (block 86). In one embodiment, the flight plan is communicated to the vehicle prior to execution of the flight plan. In another embodiment, the flight plan is pre-programmed or stored in a memory of the vehicle, and the received signal is an activation signal that causes the vehicle to execute the stored flight plan. In another example, the vehicle may have one or more flight plans stored in the memory, and the signal may include selection information for accessing a particular flight plan.

The selection of a particular flight plan may, in certain embodiments, be based on the type of special effects module carried by the vehicle. In one example, a special effects vehicle carrying a module configured for a water effect may be boundary-limited to only certain geographic areas of a park, e.g., may be bound within an area that does not include any restaurants or shopping to prevent water discharge onto diners or vendors. In another embodiment, a special effects vehicle carrying water may only be permitted to fly within a water park area of a larger theme park that also includes a non-water or general ride area. In another example, a special effects vehicle carrying a module configured for a particular scent cannon, e.g., flowers or candy, may be boundary-limited to an area of a theme park that aligns with the smell. Such instructions prevent a flower smell from being released into an area of the park with a vampire or spaceship theme. The boundary limits may be programmed into the flight plan instructions. In one embodiment, the vehicle may be permitted to fly to and from the boundary-limited area for maintenance or recharging, but special effect release may be only permitted within a certain boundary.

In operation, the special effects module may provide identification or specification information to the vehicle that in turn causes the ground controller or the vehicle to communicate or access a particular flight plan based on the characteristics of the special effects module. In conjunction with execution of the flight plan, the vehicle may receive one or more signals to release the special effects material in the special effects module (block 88). In one embodiment, the activation or release signal is bundled with the flight plan such that the release is timed to particular portions of the flight plan. Accordingly, the release signal may also be pre-preprogrammed into a memory of the vehicle and provided by the vehicle controller to the special effects module. In another embodiment, the release signal may be communicated from a remote controller, e.g., a ground controller, and, in certain embodiments, may be in response to a real-time operator input. For example, an operator may press a button to release the special effects material.

In particular embodiments, the flight plan may also include instructions to enhance a desired special effect. For example, for a smoke effect, the vehicle may circle about a character or location to create a smoke surround effect. Smoke or other gas effects may also be enhanced by banking the special effects vehicle. For example, a propeller of a quadcopter may direct the smoke in a particular direction as part of the effect or to enhance the effect. Such banking or maneuvering to enhance the effect may be integrated into the flight plan instructions. In another embodiment, the release signal may coincide with vehicle hovering to allow the special effect material 76 to disperse in a narrower location. Such an embodiment may be used in conjunction with a confetti or water cannon released over an individual. In yet another embodiment, a scented fluid may be dispersed over a wide area by instructing the vehicle to continue flying while the special effects material is being actively released. Accordingly, the ground controller or the vehicle may coordinate the release signal to coincide with appropriate flight plan signals depending on the desired effect. In addition, the release signal may also be dependent on input or feedback from position or telemetry information. Further, the vehicle flight plan may be implemented to account for stability or attitude changes that may be disrupted by release of the special effects material. In one embodiment, the vehicle may be configured to return to a desired flight plan in the event of disruptions to the flight plan caused by the thrust of a material release.

FIG. 5 is a perspective view of a special effects vehicle 18 including the special effects module 70 and implemented as a UAV. In the illustrated embodiment, the UAV includes rotors 90 coupled to a body 92 by struts 94. The special effects housing 78 of the special effects module 70 is coupled to the vehicle 18 via a connector, such as a harness 96 or clip, which in turn is coupled to the body 92 by a base 98. As illustrated, the special effects module 70 is positioned on an underside of the UAV. However, other orientations are also contemplated.

In certain embodiments, the special effects module 70 may be coupled and uncoupled from the vehicle 18 by an operator. For example, the special effects module 70 may be fully modular such that the controller and other components may be removed from the UAV by an operator and replaced by another special effects module 70. In another embodiment, the special effects module 70 may be partially modular, whereby a controller (e.g., controller 74, see FIG. 3) is housed within the base 98, and the housing 78 and associated release mechanisms 80 are removable and replaceable. An operator may screw the housing onto a threaded connector of the base to provide an electrical connection to the release mechanisms 80. In addition, the controller may be a universal controller that may work with a plurality of special effects housings 78. In this manner, the lower cost portions of the housing 78, such as the canisters or case, may be replaced or refilled without concern for the more costly or delicate processing components.

The special effects vehicle 18 may also include certain nonconsumable special effects enhancers, such as directional speakers or lights. Audio data, such as music or other audio files, may be stored on-board the vehicle 18 or may be communicated via a ground controller. In addition, the special effects vehicle 18 may also include sound abatement features, including baffles to muffle motor noises, quiet propellers, and directional speakers.

Figure 6:
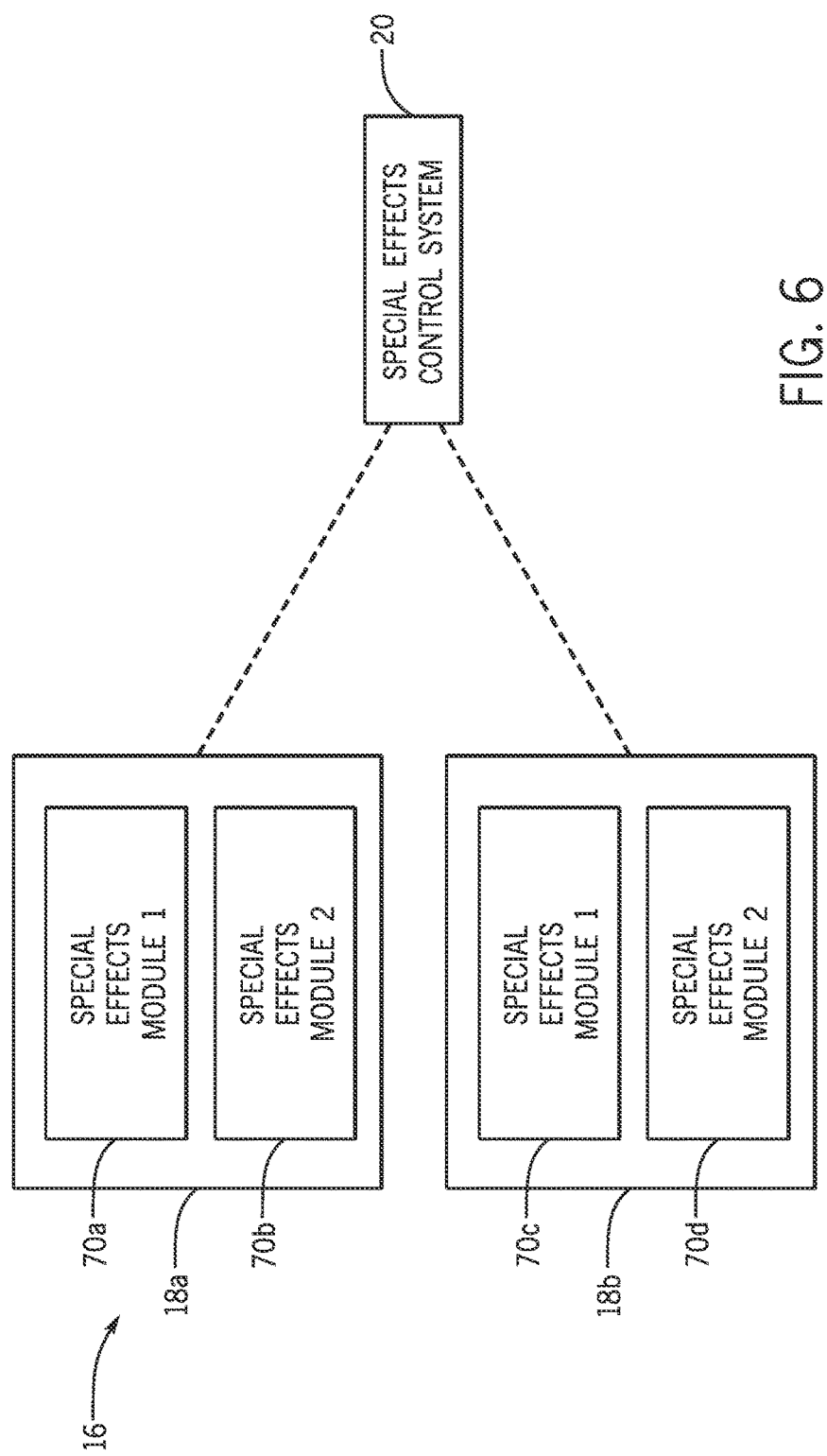
FIG. 6 is a block diagram of special effects vehicle system including special effects modules in accordance with present techniques.

A special effects vehicle fleet 16, as illustrated in the block diagram of FIG. 6, includes a plurality of vehicles 18 (e.g., vehicle 18*a*, 18*b*), which in turn may each include one or more special effects modules 70 (e.g., special effects modules 70*a*, 70*b*, 70*c*, 70*d*), which may be the same or different, and that are under control of the special effects control system 20. It is contemplated that each special effects vehicle 18 may have 1, 2, 3, 4, or more special effects modules 70. In one embodiment, the special effects vehicle 18 (e.g., vehicle 18*a*) has redundant special effects modules 70 that each contain the same type of special effects material. When operated, the special effects vehicle 18 may disperse the special effects material over several uses, either alternating between the modules for each use or completely dispersing the special effects material in a first module (e.g., special effects module 70*a*) before dispersing from the second module (e.g., special effects module 70*b*).

In another embodiment, the special effects vehicle 18 (e.g., vehicle 18*b*) may include a first special effects module (e.g., special effects module 70*c*) of a first type and a second special effects module (e.g., special effects module 70*d*) of a different type. The first type and the second type may be complementary, and designed to be released at the same time or within the same time period to produce a single special effect. For example, in one embodiment, a first special effects module (e.g., special effects module 70*c*) may include a nontoxic green slime material and the second special effects module (e.g., special effects module 70*d*) may include a water or cleaning solution dispersed via a spray nozzle. Such module types may operate together via onboard controls or in response to signals from the special effects control system 20 to release the slime material from a first special effects module at a first time point at a desired location and to release the water or cleaning solution at a second, subsequent, time point at the desired location. In this manner, a live action character or guest may be "slimed" and then cleaned off. In one embodiment, the activation of the second or subsequent special effect may be contingent upon a confirmation signal that the first effect was correctly released, which may be generated based on telemetry and other feedback devices (e.g., on-board sensors). Such an effect may also be achieved with multiple vehicles 18 (e.g., vehicles 18*a* and 18*b*) that each carry separate modules that are released in a desired order to achieve an effect. Additional special effects modules 70 or other modules may also be located on an individual special effects vehicle 18 (e.g., vehicle 18*b*) to enhance such an effect, such as a sound or camera module, and may be activated by appropriate activation signals. In one embodiment, a camera activation signal (to capture still or video images) is tied to the release of the special effects material to a guest being targeted with the special effect. The camera data may then be stored and/or communicated to a central controller for dissemination to the guests.

Special effects modules 70 onboard the same vehicle 18 may also be selected to be weight-balanced during and after release. For example, the control system 20 may time release signals to alternate between the modules to weight balance the vehicle 18. In another example, a relatively heavier water module may be located onboard with a relatively lighter scent cannon or smoke module to minimize total vehicle weight while permitting more complex special effects.

Figure 7:
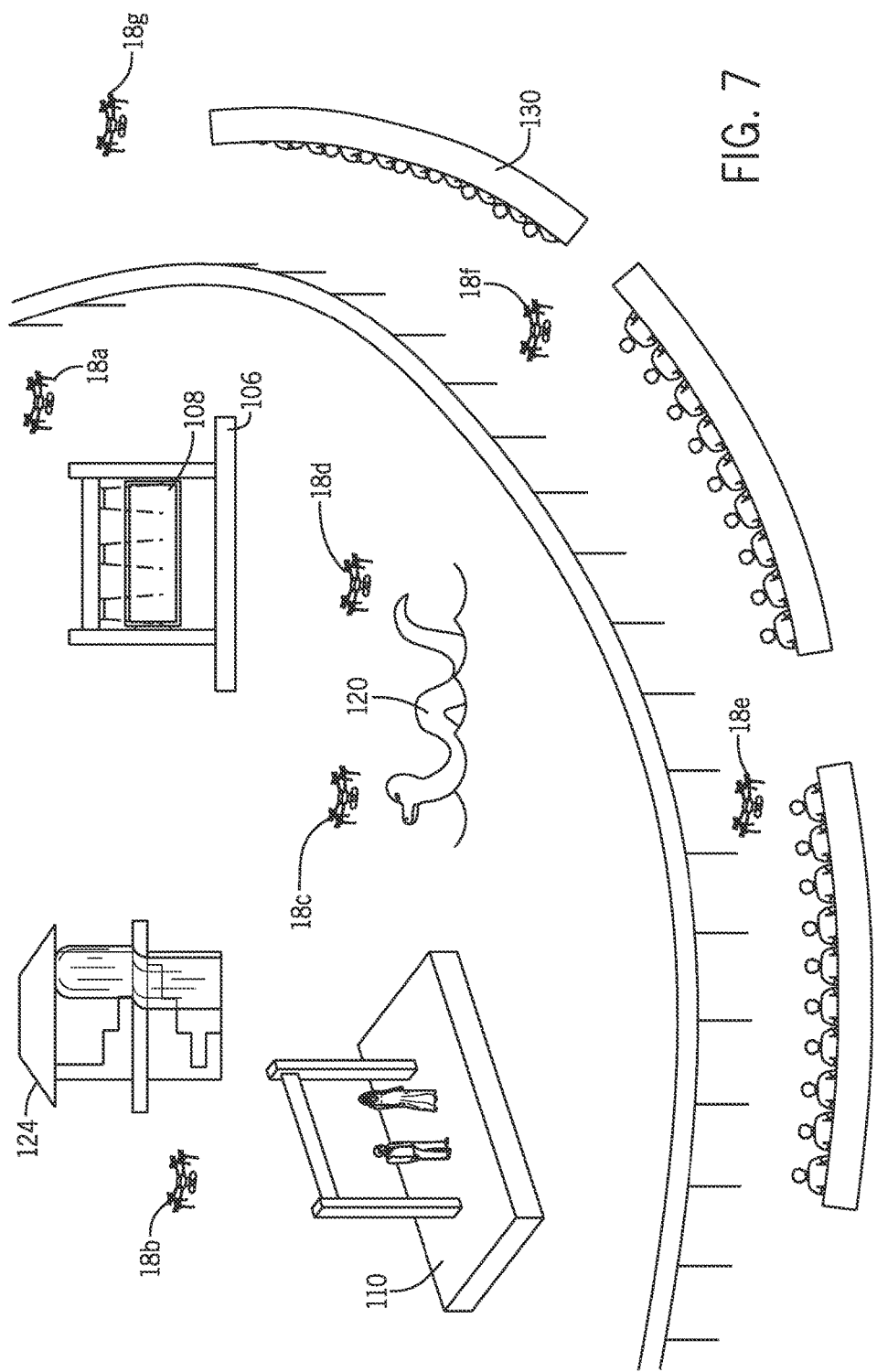
FIG. 7 is a schematic view of a theme park show including a special effects vehicle system in accordance with present techniques.

As provided herein, a special effects system may be implemented using one or more special effects vehicles 18 to enhance a guest experience at a live show, as illustrated in FIG. 7. In the illustrated embodiment, the live show is performed in a lagoon or lake setting, which adds to the challenge of supporting special effects using tethered or stationary devices. Such settings may include a stage platform 106 including a projection screen 108 with stationary lighting complexes. Special effects vehicle 18*a* is untethered from the stage platform 106, permitting triggering of special effects to augment the projected image, where the special effects may be varied in time, type, and location as the projected media content changes if the content of a show is updated. In another example, a live show may include a stage platform 110 featuring live character actors and/or animatronic figures 120. Special effects vehicles 18*c* and 18*d* may be programmed to interact with the live actors or the animatronic figures 120. Such programming may be dynamic to account for changes in blocking or timing that may occur. In one example, a live actor may be surrounded by smoke upon reaching a particular stage location within a certain time frame. In another embodiment, live actors may wear radio transmitting devices that are configured transmit a release signal to the special effects vehicle upon actuation of a button or other triggering device. Activation of the special effects may also be initiated in real-time by a show technician. In yet another embodiment, an animatronic figure 120 may include feedback devices that communicate with the special effects vehicles 18*c* or 18*d* to generate a particular special effect. Such live shows may also include fairly complex set pieces, such a towers or catwalks 124, and the special effects vehicle 18*b* may have more granular location control to permit special effects in relatively hard-to-access set pieces. Further, because such shows are often designed to be seen from multiple angles, the special effects vehicle 18b may circle such set pieces to create special effects that are visible at multiple audience angles.

In addition to effects that are located at or near a stage or platform, the special effects vehicles may be used to generate effects for the audience. Special effects vehicles 18e, 18f, 18g may be programmed with flight paths that are generally in the location of audience seating 130. Audience-centered effects may be timed to coordinate with events during the show. In the illustrated example, at least some of the special effects vehicles 18 may have different special effects modules depending on the desired effects. In another embodiment, a finale or larger special effect may be released simultaneously by a group of special effects vehicles 18. For example, bubbles may be released over the entire audience as an effect for an undersea-themed show. The release may coincide with a flight path over the audience such that many more audience members experience the effect relative to a stationary bubble machine. The air current created by the flying vehicles may further act to disperse the bubbles through the audience seating 130. Vehicle orientation to enhance effect dispersion may be integrated into the flight plan instructions.

Figure 8:
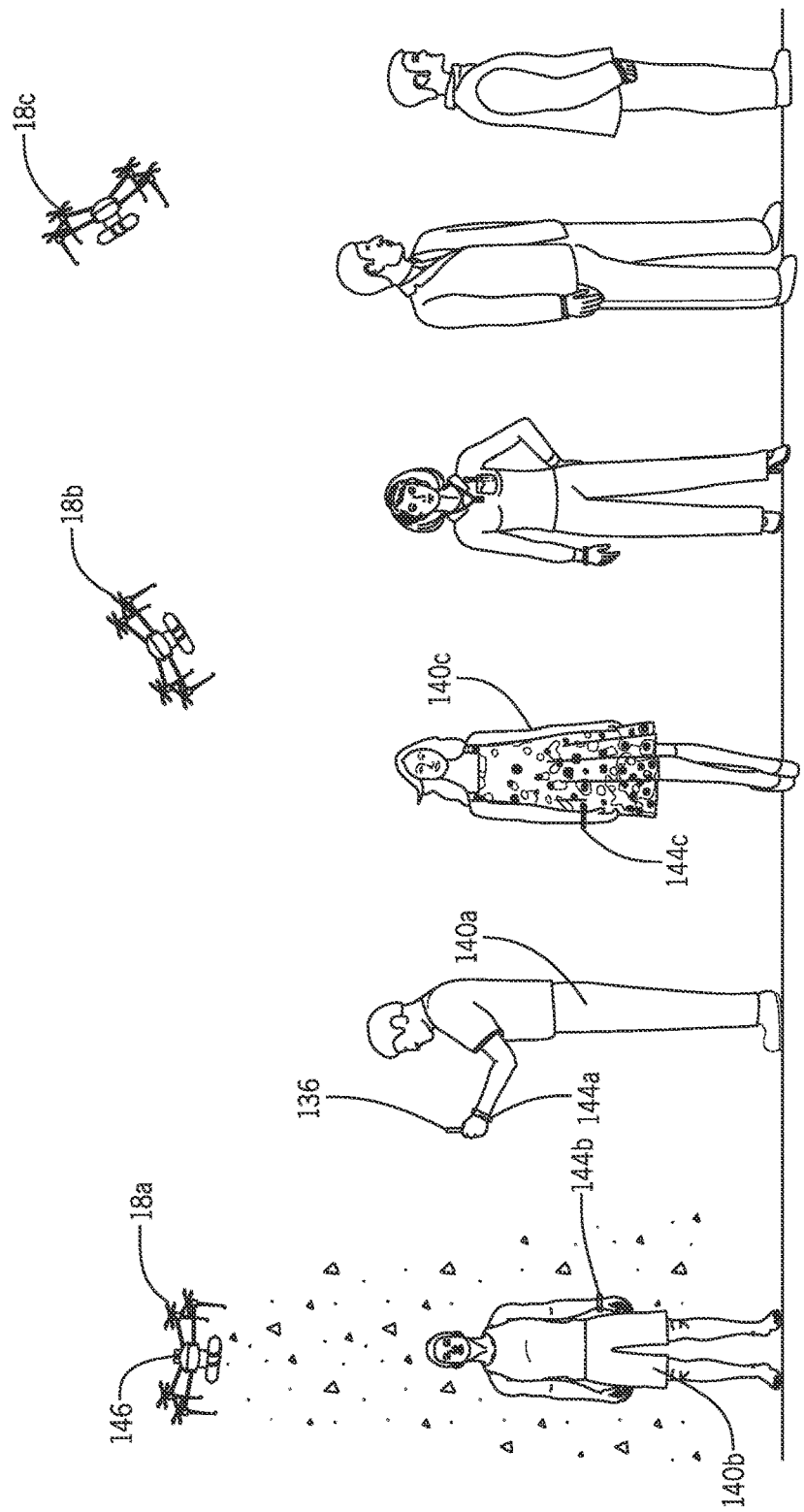
FIG. 8 is a schematic view of guest-controlled special effects in accordance with present techniques.

In addition to special effects that support live shows, the special effects vehicles may be used in conjunction with other guest experiences. FIG. 8 is a schematic illustration of a guest-controlled triggering of a special effect. The techniques provided herein may permit a guest 140 to provide input to the special effects control system, e.g., via a handheld device 136 or, in certain embodiments, via a guest wearable device 144. Such an event may be tied to game play or an achievement level. For example, if the guest 140a reaches a particular game level via the handheld device 136, the special effects control system may initiate a special effect, illustrated as a water spray released by the special effects vehicle 18a, targeting a companion 140b or fellow game player. In one embodiment, the companion or fellow game player may be identified via a group or family association that is stored in the control system. For example, members of a family may associate their guest-wearable devices 144 with one another (e.g., at park entry or via a pre-registration process). Such association may include permission for members of the group (e.g., a friend or family group or guests who have registered for a game or experience) to target one another for release of special effects while guests not in the group are not permitted to be targeted. The input signal may be generated by the handheld device 136 or guest wearable device 144, while the special effect vehicle 18a is targeted to a location of the handheld device 136 or a particular guest-wearable device 144b and away from guests wearing non-targeted guest-wearable devices 144a and 144c based on radio transceiver signals from such devices that provide location information from other guests. The special effects control system may tie the release signal to conditions in which the release only effects a guest 140 wearing a specific guest-wearable device 144 and may prevent or prohibit release if other guest-wearable devices 144 that are not targeted are in the vicinity. While the illustrated example shows the guest 140a targeting the companion 140b, an individual guest 140 may target themselves. For example, a guest 140 may wish to receive a cooling mist spray or a bubble effect. By providing an input to the handheld device 136 or via the guest-wearable device 144, the special effects vehicle 18 is instructed to move towards the guest.

The handheld device 136 or guest-wearable devices 144 may also identify eligible players of a role-playing game or other live action experience that may be enhanced by special effects. For example, a group of guests 140 may register for a park experience. Such guests 140 may be issued dedicated handheld or wearable devices, or the registration information may be associated with a general handheld or wearable device used for other park experiences. The special effects control system may execute instructions to trigger special effects for registered guests 140 at random intervals or at predetermined times or locations. Accordingly, in certain embodiments, the special effects may be associated with particular guests and triggered without additional guest input.

In one embodiment, the handheld device 136 may be a wand including an identification code or a camera-resolvable feature. The handheld device 136 is configured to interact with the special effects vehicle, which may also include a camera 146 capable of resolving the wand feature. In one embodiment, the special effects may be triggered based on motion of the handheld device 136 as resolved by the camera. Other types of triggered special effects may be based on a fight or dueling experience, in which the wands trigger different types of special effects based on the wand motions. Special effects vehicles 18 used in conjunction with such experiences may be implemented to carry onboard special effects modules associated with a successful wand motion, such as a flash or explosion effect as well as special effects modules associated with unsuccessful wand motion, such as confetti or a bubble effect.

Figure 9:
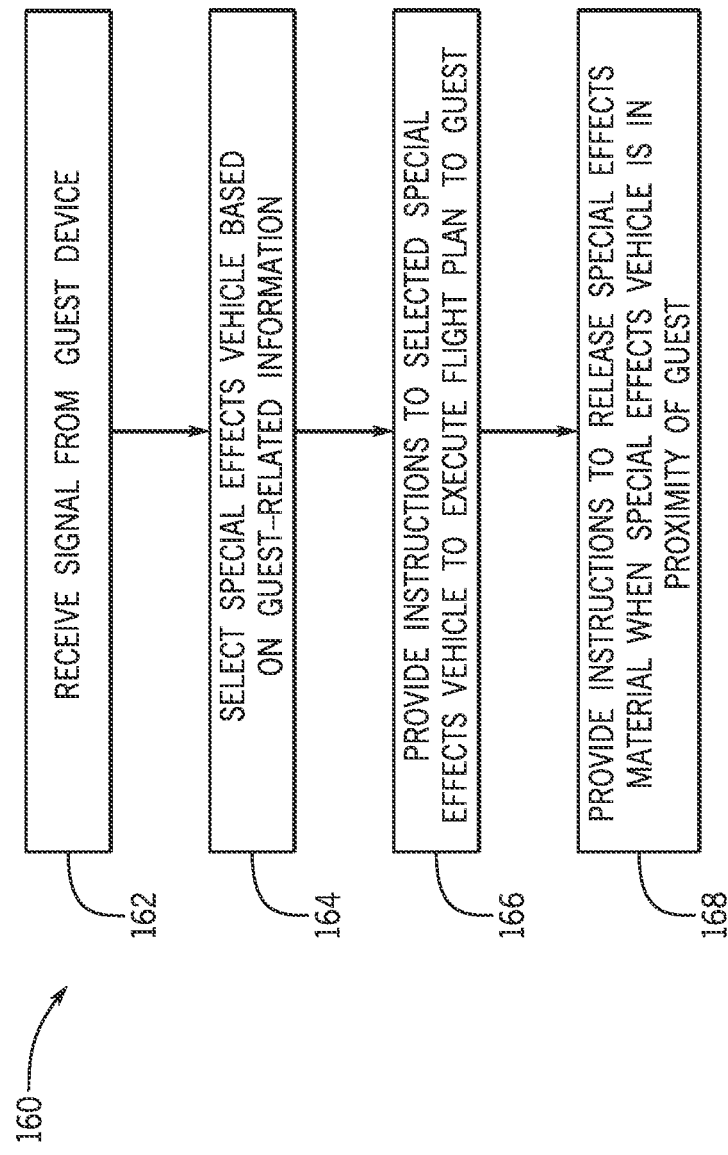
FIG. 9 is a flow diagram of a method for using the special effects vehicle system for guest-mediated special effects in accordance with present techniques.

FIG. 9 is a flow diagram of a method 160 of mediating guest control of special effects. The special effects control system receives (block 162) a signal based on guest input from the guest device. The input signal may be related to a guest achievement or a guest game play event, such as reaching a new level, hitting a target, solving a puzzle, or picking a particular game item. Based on the signal, the special effects control system selects (block 164) a vehicle from the fleet that includes an appropriate special effects module. In addition, the selecting may be based on guest-related information that may be stored in a guest profile. For example, a guest may specify a lack of interest in participating in special effects or in a subset of special effects types. For example, if the triggered special effect is a water spray, the method 160 may access information that the guest is not interested in such effects. The method may then select a special effects vehicle carrying a special effects module with an alternative effect type, such as bubbles, scent, or confetti.

In other embodiments, a guest may indicate an allergy to a particular scent or material, and the selected special effects vehicle may be determined based on such information. Further, certain guests may be ineligible for special effects triggering based on age or a lack of VIP status. In such an example, the method terminates without selecting a vehicle. The vehicle selection may also be based on determining the closest appropriate vehicle to the guest. That is, if the guest has triggered a water effect, the method 160 selects a closet vehicle to the guest and that is carrying a water special effects module. Once selected, the method 160 provides instructions to the selected special effects vehicle to execute (block 166) a flight plan to the guest and to release (block 168) the special effects material when in proximity of the guest. The determination of proximity may be based on vehicle navigation and proximity feedback as well as feedback from a guest-wearable device, such as a bracelet including a radio transceiver. Thus, the flight plan may be updated periodically or in real time.

Figure 10:
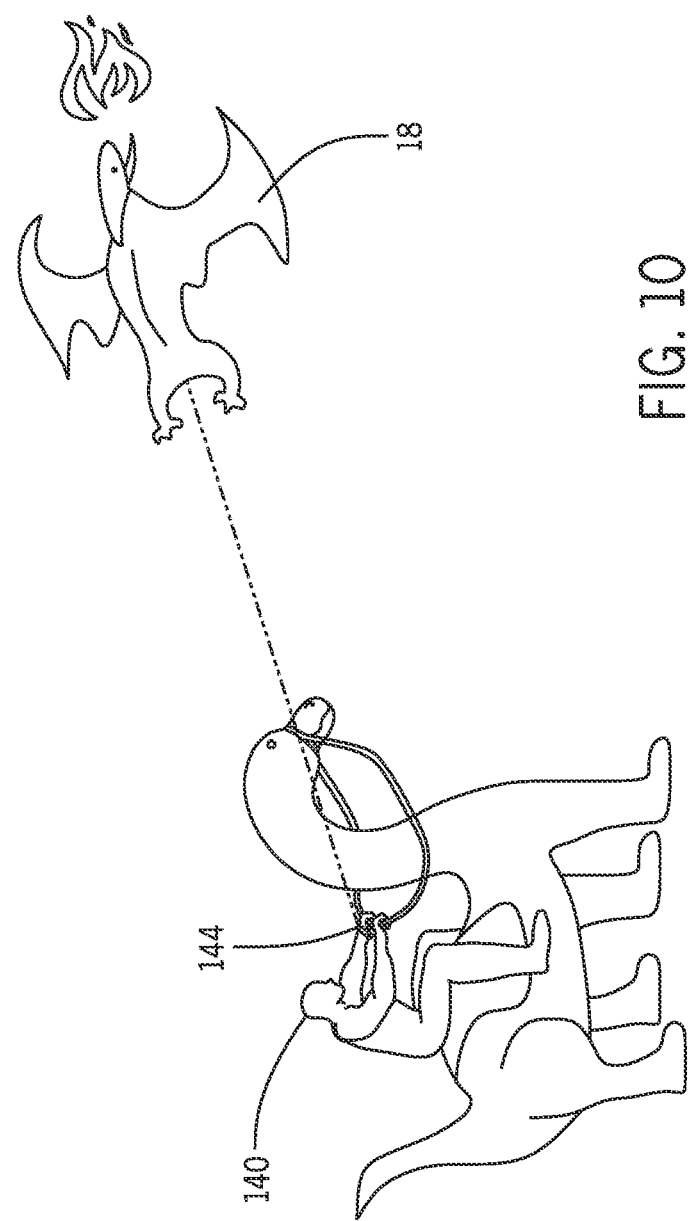
FIG. 10 is a schematic view of a special effects vehicle used in conjunction with an amusement park ride in accordance with present techniques.

Special effects vehicles may also be incorporated into rides. FIG. 10 is a schematic illustration of a dinosaur-themed ride in which a special effects vehicle 18 is implemented with an exterior appearance of a flying dinosaur that is part of the ride theme. In one embodiment, as a guest 140 approaches the vicinity of the special effects vehicle, e.g., as determined via signals from the wearable device 144, a special effect is triggered, such as a flame effect. Multiple special effects vehicles 18 may be programmed to execute random or predetermined flight plans about the location of the ride to enhance the guest immersion. In addition, special effects vehicles 18 may be deployed in a ride queue to capture guest interest while waiting for a ride. In one embodiment, the special effects vehicle flight path may function to lead guests through a path or maze, staying just ahead so that the guests chase the special effects vehicle 18.

In yet another embodiment, a special effects vehicle 18 may be programmed to "stay on station" within a limited area to wait for possible guest interaction. For example, as guests move through shopping and restaurant areas, a special effects vehicle 18 positioned in a dark alley may trigger a flash or smoke effect. After a guest approaches and the special effect is triggered, the vehicle resumes the stay-on-station flight plan until the next guest arrives or until the special effects module is in need of replacement or service. Such special effects may be used within a ride or within other areas of the theme park.

Figure 11:
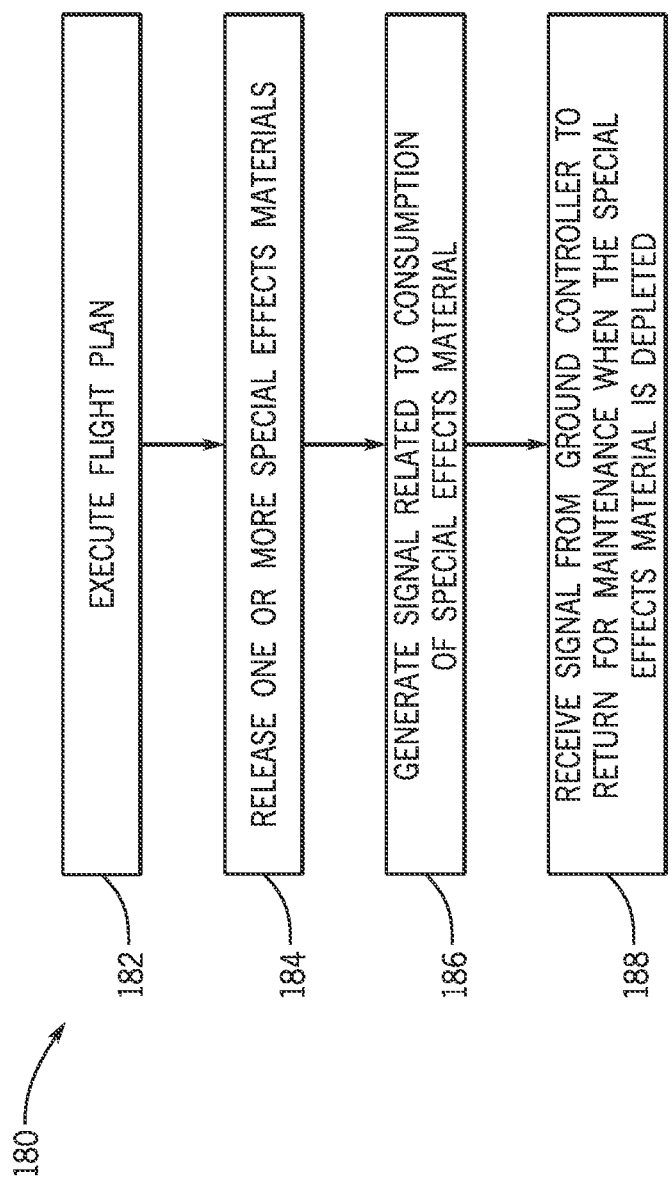
FIG. 11 is a flow diagram of a maintenance method for the special effects vehicle system in accordance with present techniques.

A special effects system as provided herein may facilitate additional guest experiences through untethered special effects that may be triggered at a wide variety of locations throughout the park. Such special effects use special effects materials that are consumable and that may only be triggered for a limited number of uses before being refilled or replaced. FIG. 11 is a flow diagram of a method 180 for vehicle maintenance for special effects vehicles through an entertainment venue executing (block 182) a variety of flight plans and, under control of the special effects control system., releasing (block 184) one or more special effects material. After triggering the special effects, the vehicle generates (block 186) a feedback related to the consumption of the special effects material. The feedback may be generated by a sensor coupled to a special effects module, such as a pressure sensor. When the signal is associated with a depletion of the special effects material, the special effects control system sends a signal to the special effects vehicle, which receives (block 188) the signal to return for maintenance. Such maintenance may include refilling or replacing special effects material. Further, the maintenance may be automatic, whereby an individual vehicle 18 is instructed to align with an appropriate autofilling station at a maintenance location. Once a feedback from the autofiller and/or the vehicle 18 indicates that the special effects module has completed maintenance (e.g., an appropriate fill level of a special effects material), the maintenance signal ceases and/or new instructions to return to station in the park may be provided.

Previously disclosed embodiments are described in the context of untethered UAVs to provide a special effects platform for a theme park or other entertainment venue. However, present embodiments may include UAVs that are tethered as well. For example, FIG. 12 illustrates an attraction environment 200 including a special effects vehicle 18 that is tethered to a ceiling 202 via a cable or power cord 204. The cord 204 is in turn coupled to the power source 72 for the vehicle 18. In this manner, the vehicle 18 may be implemented without an onboard power source, which may provide certain weight advantages. In other embodiments, the tethered vehicle 18 may have an additional onboard power source.

While only certain features of the present embodiments have been illustrated and described herein, many modifications and changes will occur to those skilled in the art. It is, therefore, to be understood that the appended claims are intended to cover all such modifications and changes as fall within the true spirit of the present disclosure. Further, it should be understood that certain elements of the disclosed embodiments may be combined or exchanged with one another.

The invention claimed is:

1. An amusement park special effects system comprising:
a ground controller;
an unmanned aerial vehicle;
communications circuitry of the unmanned aerial vehicle configured to transmit signals to and receive signals from the ground controller;
a vehicle controller of the unmanned aerial vehicle configured to execute a flight plan;
at least one special effects module of the unmanned aerial vehicle;
a release mechanism of the at least one special effects module;
a special effects module controller of the at least one special effects module, the special effects module controller configured to instruct the at least one special effects module to activate the release mechanism in response to an activation signal from the ground controller; and
a special effects material disposed within the at least one special effects module, wherein the release mechanism is configured to release the special effects material from the at least one special effects module when activated by the special effects module controller, and wherein the special effects material is disseminated at release.

2. The special effects system of claim 1, wherein the special effects material comprises a fluid.

3. The special effects system of claim 2, wherein the special effects material comprises a smoke effect fluid.

4. The special effects system of claim 2, wherein the special effects material comprises a scented fluid.

5. The special effects system of claim 2, wherein the special effects material comprises water.

6. The special effects system of claim 1, wherein the special effects material comprises glitter or confetti.

7. The special effects system of claim 1, wherein the special effects material comprises paper.

8. The special effects system of claim 1, wherein the release mechanism is configured to release all or most of the special effects material when activated by the special effects module controller.

9. The special effects system of claim 1, wherein the special effects module controller is configured to deactivate the release mechanism to stop the release mechanism from releasing the special effects material, and wherein the at least one special effects module is configured to deativate the release mechanism before all or most of the special effects material is released.

10. The special effects system of claim 1, wherein the at least one special effects module comprises a sensor configured to output a module signal to the special effects module controller indicating an amount of special effects material in the special effects module.

11. An amusement park special effects system comprising:

a ground controller;

an unmanned aerial vehicle;

communications circuitry of the unmanned aerial vehicle configured to transmit signals to and receive signals from the ground controller;

a vehicle controller of the unmanned aerial vehicle configured to execute a flight plan in response to a signal from the ground controller;

at least one special effects module of the unmanned aerial vehicle;

a release mechanism of the at least one special effects module;

a special effects module controller of the at least one special effects module, the special effects module controller configured to instruct the at least one special effects module to activate the release mechanism in response to an activation signal from the ground controller and in response to a location feedback related to a position of the unmanned aerial vehicle; and a special effects material disposed within the at least one special effects module, wherein the release mechanism is configured to release the special effects material from the at least one special effects module when activated by the special effects module controller, and wherein the special effects material is disseminated at release.

12. The special effects system of claim 11, comprising a guest device configured to transmit a guest signal to the ground controller to cause the ground controller to send the activation signal to the unmanned aerial vehicle.

13. The special effects system of claim 12, wherein the ground controller is configured to select the unmanned aerial vehicle from a fleet of unmanned aerial vehicles based on a proximity to the guest device.

14. The special effects system of claim 12, wherein the ground controller is configured to select the unmanned aerial vehicle from a fleet of unmanned aerial vehicles based on a proximity to an associated device linked to the guest device, wherein the associated device is associated with the guest device via a family or group association.

15. The special effects system of claim 12, wherein the guest device is configured to wirelessly transmit the guest signal.

16. The special effects system of claim 12, wherein the guest device is a bracelet comprising a radio transceiver configured to transmit the guest signal.

17. The special effects system of claim 11, wherein the at least one special effects module comprises a nozzle or sprayer oriented away from the unmanned aerial vehicle and configured to dispense the special effects material.

18. The special effects system of claim 11, wherein the vehicle controller is configured to execute the flight plan to cause the unmanned aerial vehicle to continue flying during the release of the special effects material.

19. A method, comprising:

receiving a signal at a ground controller, the signal comprising information about a guest achievement or a game play event;

accessing guest information based on the signal; and transmitting a flight plan and a special effects activation signal to an unmanned aerial vehicle based on the signal to cause a special effects module of the unmanned aerial vehicle to disperse a special effects material in proximity of a guest in response to an activation signal from the ground controller and in response to a location feedback related to a position of the unmanned aerial vehicle.

20. The method of claim 19, comprising selecting the unmanned aerial vehicle from a fleet of unmanned aerial vehicles based on a presence of a desired special effects material in the special effects module.

21. The method of claim 20, wherein the selecting is based on the guest information.

22. The method of claim 21, wherein the guest information comprises information identifying special effects materials not to be released in proximity of the guest.

23. The method of claim 20, wherein the selecting is based on the guest achievement or the game play event and the desired special effects material is associated with the guest achievement or the game play event.

* * * * *